D. W. ATHERTON.
Velocipede.
No. 92,689.  Patented July 20, 1869.
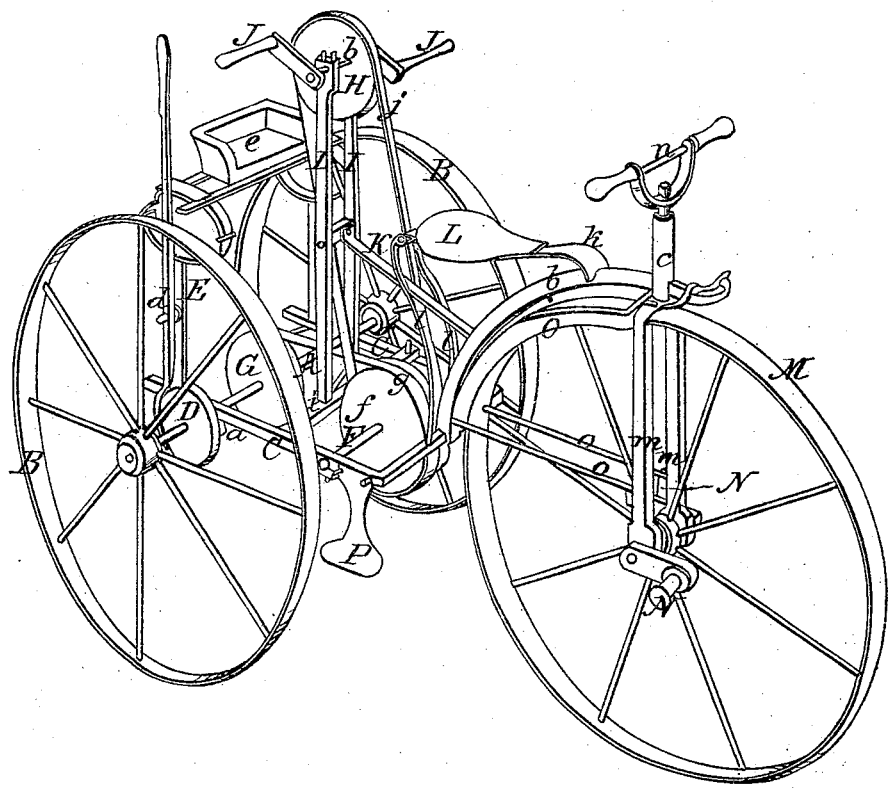

United States Patent Office.

DANIEL W. ATHERTON, OF DETROIT, MICHIGAN.

Letters Patent No. 92,689, dated July 20, 1869.

IMPROVEMENT IN VELOCIPEDES.

The Schedule referred to in these Letters Patent and making part of the same.

*To whom it may concern:*

Be it known that I, DANIEL W. ATHERTON, of Detroit, in the county of Wayne, and State of Michigan, have invented a new and useful Improvement in Velocipedes; and I do declare that the following is a true and accurate description thereof, reference being had to the accompanying drawings, and to the letters of reference marked thereon, and being a part of this specification.

The nature of this invention relates to an improvement in the construction of velocipedes, of the class usually denominated "tricycles," so arranged that it may be operated by one person, or by two at the same time.

The invention consists in combining the ordinary method of driving velocipedes, by means of foot-cranks, with a seat, for a second rider, set above the rear axle, and an arrangement of cranks, pulleys, and belts, by means of which the second rider may aid in the propulsion of the vehicle; also, in a mud-shield, secured over the front wheel, to protect the limbs and clothing of the rider who operates the foot-cranks; and in a brake, by means of which the progress of the vehicle may be checked, when desired.

In the drawings—

A represents an axle, to which are secured the wheels B, said axle rotating in suitable boxes $a$, secured to and supporting the frame C, the front end of which is secured to the circular or gooseneck-shaped reach $b$, which is provided with hollow standard, $c$.

D is a small smooth-faced wheel, rigidly secured to the axle, and is designed to check the progress of the vehicle, when the brake $d$, which is pivoted to one of the standards E, which sustains the seat $e$, is compelled to impinge against it.

Any suitable springs may be interposed between the seat and its support.

F is a countershaft, the ends of which are properly journalled to the frame C, and has secured to it a wide-faced pulley, $f$, which communicates motion, by means of the belt $g$, to the smaller pulley G, which is rigidly secured to the centre of the axle A.

H is another pulley, rigidly secured to the crank-shaft $h$, which is journalled to the top of the standards I, the lower ends of which are secured to and sustained by the cross-bar $i$, which, in turn, is secured to the frame C.

The crank-shaft is provided with two cranks J, one on each end thereof, which are designed to be operated by the rider upon the seat $e$, and, by means of the belt $j$, giving motion to the pulleys $f$ and G, and belts $j$ and $g$, and axle A.

A brace, K, keeps the standards I in a vertical position.

A saddle, L, furnishes a suitable seat for the rider who operates the foot-cranks.

This saddle is placed upon a spring, $k$, the front end of which is properly secured to the reach $b$, while its rear end is suspended between the standards $l$, the lower ends of which are secured to the front bar of the frame C.

M is a wheel, rigidly secured to a short axle, which is journalled to the lower ends of the standards $m$, each end of this axle being provided with the usual foot-cranks N.

The standards $m$ are connected at top, and terminate in a round bar, which is sleeved within the hollow standard $c$, and, passing through the same, is provided with double guiding-lever, $n$.

O is a mud-shield, partially enclosing the rim of the wheel M, to protect the rider upon the saddle. This shield is secured in place by being attached to the standards $m$, below the hollow standard $c$, at one end, and at the other, by the braces $o$.

P is a suitable step, to assist the second rider to reach the seat $e$.

A double-curved bar, $p$, secured to the front end of the reach $b$, affords a resting-place for the limbs of the occupant of the saddle, when desired.

The operation of this apparatus has been so fully described in the foregoing specification, that any further description thereof is deemed unnecessary.

What I claim as my invention, and desire to secure by Letters Patent, is—

The combination of the axle A, wheels B and M, frame C, brake-wheel D, standards E, I, $l$, and $m$, countershaft F, pulleys G, H, and $f$, cranks J, belts $g$ and $j$, boxes $a$, reach $b$, hollow standard $c$, brake $d$, seat $e$, crank-shaft $h$, saddle L, spring $k$, foot-cranks N, guiding-lever $n$, mud-shield O, step P, and bar-rest $p$, when constructed and arranged substantially as herein described, and so as to be operated by one or two persons at the same time, as herein set forth.

DANIEL W. ATHERTON.

Witnesses:
 JAS. I. DAY,
 H. F. EBERTS.